(12) United States Patent
Whitehouse

(10) Patent No.: US 8,788,474 B2
(45) Date of Patent: Jul. 22, 2014

(54) INODE EVENT NOTIFICATION FOR CLUSTER FILE SYSTEMS

(75) Inventor: Steven John Whitehouse, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 654 days.

(21) Appl. No.: 12/971,586

(22) Filed: Dec. 17, 2010

(65) Prior Publication Data

US 2012/0158683 A1    Jun. 21, 2012

(51) Int. Cl.
*G06F 17/30* (2006.01)
*G06F 7/00* (2006.01)

(52) U.S. Cl.
USPC .......................................... 707/704; 707/781

(58) Field of Classification Search
USPC .................... 707/704, 781, 999.008
See application file for complete search history.

(56) References Cited

U.S. PATENT DOCUMENTS

| | | | | |
|---|---|---|---|---|
| 5,828,876 | A * | 10/1998 | Fish et al. ............................ | 1/1 |
| 6,032,216 | A * | 2/2000 | Schmuck et al. ............. | 710/200 |
| 6,493,804 | B1 * | 12/2002 | Soltis et al. ................... | 711/152 |
| 7,680,794 | B2 * | 3/2010 | Verma et al. ........... | 707/999.008 |
| 2006/0206912 | A1 * | 9/2006 | Klarfeld et al. ................ | 725/40 |
| 2006/0248127 | A1 * | 11/2006 | Whitehouse .................. | 707/203 |
| 2007/0198519 | A1 * | 8/2007 | Dice et al. .......................... | 707/8 |
| 2008/0256074 | A1 * | 10/2008 | Lev et al. .......................... | 707/8 |
| 2014/0032515 | A1 * | 1/2014 | Vaghani et al. ................ | 707/704 |

OTHER PUBLICATIONS

MC Dharmadeep Title: "Optimizations in SAN and DAS" Department of Computer Science and Automation; Indian Institute of Science Bangalore—560 012; Jan. 2007.*

* cited by examiner

*Primary Examiner* — Md. I Uddin
(74) *Attorney, Agent, or Firm* — Lowenstein Sandler LLP

(57) ABSTRACT

A mechanism for inode event notification for cluster file systems is disclosed. A method of the invention includes implementing a lock scheme for a cache manager associated with an inode of a cluster file system, wherein the lock scheme includes a null lock (NL) used as a reference count for a lock value block (LVB) and an exclusive (EX) lock used for setting up inode event notifications, and associating a first global counter and a second global counter with the cache manager for the inode, wherein the first global counter is configured to track one or more processes that have the inode open in read-only mode and the second global counter is configured to track processes that have the inode open in read-write mode.

15 Claims, 4 Drawing Sheets

200

```
Implementing a lock scheme for a cache manager associated with an inode of a
cluster file system, wherein the lock scheme includes a null lock (NL) used as a
reference counter for a lock value block (LVB), a concurrent read (CR) lock used
to retain LVB content in a no event case, a concurrent write (CW) lock used for
direct input/output (I/O), a protected read (PR) lock used to share data and
metadata, a protected write (PW) lock used for exclusive write access to the
inode, and an exclusive lock (EX) lock used for setting up inode event
notifications only
                                                                            210
```

↓

```
Associating a first global counter and a second global counter with the cache
manager for the inode, the first global counter to track processes that have the
inode open read-only and the second global counter to track processes that have
the inode open read-write, wherein the processes may be running on any of a
plurality of nodes in the cluster file system
                                                                            220
```

↓

```
Taking an EX lock on the cache manager of an inode in order to initialize a watch
for an event on that inode, wherein the taking of the EX lock causes any open
calls on the inode by other nodes in the cluster file system to be blocked, their
associated locks demoted to the NL lock, and at least one of the first or second
global counters to be updated accordingly
                                                                            230
```

↓

```
Examining both of the first global counter and the second global counter to
determine whether any of the plurality of nodes have the inode open in at least
one of read-only or read/write modes
                                                                            240
```

↓

```
Determining whether to grant a lease on the inode based on information obtained
from examining the first and second global counters
                                                                            250
```

*Fig. 2*

300 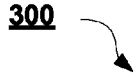

Opening an inode for a resource when accessing the resource via a cluster file system
310

Maintaining at least a CR lock on the glock for the inode
320

Upon the demotion of the glock to an NL lock due to the taking of an EX lock on the inode's glock by another node in the cluster file system, incrementing a first global counter if the inode is open in read-only mode and incrementing a second global counter if the inode is open in read-write mode
330

Re-queueing a request for higher lock mode for the inode's glock upon the demotion of the glock to an NL lock
340

*Fig. 3*

INODE EVENT NOTIFICATION FOR CLUSTER FILE SYSTEMS

TECHNICAL FIELD

The embodiments of the invention relate generally to cluster file systems and, more specifically, relate to a mechanism for inode event notification for cluster file systems.

BACKGROUND

Conventionally, a distributed file system, also referred to as a cluster file system, is a file system that allows access to resources (e.g., files) from multiple hosts that are sharing the file system via a computer network. A cluster file system, or storage cluster, provides a consistent file system image across servers (nodes) in a cluster, allowing the servers to simultaneously read and write to a single shared file system. A storage cluster is capable of implementing the data storage component of highly available systems.

One type of cluster file system is a Global File System 2 (GFS2), which is a shared disk file system for Linux computer clusters. With GFS2, each server, or node, has its own page cache which may contain some portion of the on-disk data from the shared storage. GFS2 uses a locking mechanism called glocks to maintain the integrity of the cache between nodes. The glock subsystem provides a cache management function which is implemented using the distributed lock manager (DLM) as the underlying communication layer. Glocks provide protection for the cache on a per-inode basis. An inode is a data structure on the shared file system that stores all information about a file of the shared file system except its name and its actual data. Each inode has two glocks associated with it. The first glock is used for controlling the caching of data associated with the inode, and the second glock is used to control the lifetime of the inode itself. Each glock has one DLM lock associated with it.

Conventionally, a DLM lock is used, to arbitrate access requests relating to that inode from multiple nodes. In the GFS2 file system these are the unique DLM locks associated with each inode's glock. Each of the DLM locks associated with the inode's glock has a lock value block (LVB), which is a small amount of memory (anywhere from 16 to 32 bytes) that can be written when the DLM lock is held in exclusive mode.

Currently, no efficient inode notification system exists that provides support for POSIX (Portable Operating System Interface [for Unix]) lease. A file lease provides a mechanism whereby the process holding the lease (the "lease holder") is notified (via delivery of a signal) when a process (the "lease breaker") tries to open or truncate that file. The lease can only be granted if the inode itself is not open anywhere in the cluster in a particular mode (the mode depends upon the type of lease required). In GFS2, opening a file requires obtaining a shared lock (DLM mode PR) so that holding a lock of an incompatible mode will result in blocking open requests across the cluster. This, however, still does not tell the requesting process whether any other node is holding this lock open.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 2 is a flow diagram illustrating a method performed by a lock manager of a file system for inode event notification for cluster file systems according to an embodiment of the invention;

FIG. 3 is a flow diagram illustrating a method performed by a cluster node for inode event notification for cluster file systems according to an embodiment of the invention.

DETAILED DESCRIPTION

Figure 1:
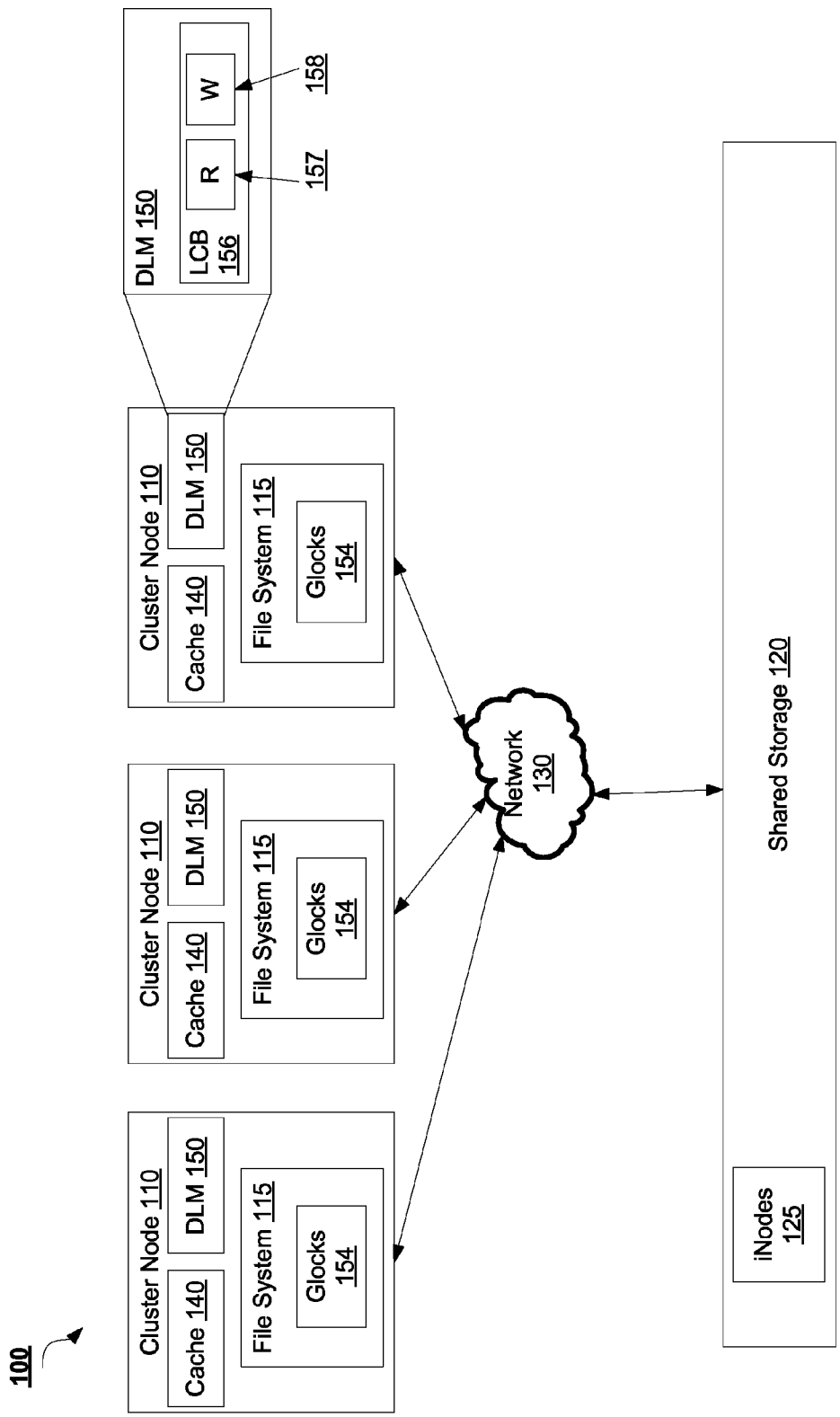
FIG. 1 is a block diagram of a cluster infrastructure utilizing shared storage according to an embodiment of the invention.

Embodiments of the invention provide a mechanism for inode event notification for cluster file systems. A method of embodiments of the invention includes implementing a lock scheme for a cache manager (e.g., a glock) associated with an inode of a cluster file system, wherein the lock scheme includes a null lock (NL) used as a reference count for a lock value block (LVB), an exclusive (EX) lock used for setting up inode event notifications, and other locks discussed below. The method next includes associating a first global counter and a second global counter with the cache manager for the inode, wherein the first global counter is configured to track one or more processes that have the inode open in read-only mode and the second global counter is configured to track processes that have the inode open in read-write mode. The method may further include taking an EX lock on the cache manager of the inode to initialize a watch for an event on that inode.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "implementing", "associating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for inode event notification for cluster file systems. The mechanism for inode event notification of embodiments of the invention implements POSIX lease support and inotify support across a clustered file system in an efficient manner. An "efficient manner" means that in the normal case of no events being monitored for an inode, no extra operations which require cluster communication (including locking) or block I/O are performed when compared with a cluster file system without inode event notification support.

FIG. 1 is a block diagram of a cluster infrastructure 100 utilizing shared storage according to an embodiment of the invention. Cluster infrastructure 100 includes a plurality of cluster nodes 110 communicably coupled to shared storage 120 via a network 130. In some embodiments, network 140 may be a local area network (LAN), a wide area network (WAN), an intranet, an extranet, or the Internet, to name a few examples.

In one embodiment, the one or more cluster nodes 110 may be server machines executing applications that read and write data, via a mounted file system 115, to shared storage 120. The file system 115 mounted on each cluster node 110 allows the multiple cluster nodes 110 to access shared storage 120 at a block level as if the storage were connected locally to each cluster. In one embodiment, the file system 115 is a Global File System 2 (GFS) file system. In other embodiments, the file system 115 is a Cluster Shared Volumes (CSV) file system or General Parallel File System (GPFS) or any other cluster file system.

As shown in FIG. 1, file system 115 has a lock manager component 150. The lock manager component 150 is a service that provides a mechanism for other cluster infrastructure 100 components to synchronize their access to resources, such as a shared storage 120. In one embodiment, the lock manager component 150 is a distributed lock manager (DLM) that runs in each cluster node 110. DLM is used not only for file locking, but also for coordination of all disk access.

In some embodiments, shared storage 120 includes a plurality of inodes 125. An inode 125 is a data structure on a traditional Unix-style file system that stores basic information about a regular file, directory, or other file system object. Each file of the file system 115 overlying shared storage 125 is associated with an inode 125. The information stored in the inode 125 may include information about user and group ownership, access mode (read, write, execute permissions), and type of file. An inode 125 stores all information about a file except its name and its actual data.

In embodiments of the invention, each cluster node 110 has its own page cache 140, which may contain some portion of the on-disk data from the shared storage 120. In the illustrated embodiment, the file system 115 utilizes a locking mechanism called glocks 154 to maintain the integrity of the cache 140 between cluster nodes 110. The glock subsystem 154 provides a cache management function for the GFS2 file system which is implemented using DLM 150 as the underlying communication layer. In alternative embodiments utilizing cluster file systems other than GFS2, locking mechanisms similar to glocks are used for cache management. Such mechanisms, including glocks, are collectively referred to herein as a cache manager. It should be noted that references to glocks are provided herein for illustration only, and the embodiments of the invention are applicable to other cache managers without loss of generality.

Glocks 154 provide protection for the cache 140 on a per-inode 125 basis. Each inode 125 of the file system 115 has two glocks 154 associated with it. One glock (iopen glock) keeps track of which processes have the inode open. The other glock (inode glock) controls the cache relating to that inode. It is the inode glock that is relevant to this description, and any reference to glock herein will be in reference to the inode glock.

One service that the glocks 154 can provide for file system 115 is an inode event notification system. Each glock 154 has a corresponding DLM lock 150. Glocks 154 and their associated DLM locks 150 provide notifications of events by implementing notification locks. Notification locks are allocated such that there is exactly one of these locks uniquely associated with each inode 125. Furthermore, conventionally, each inode glock 154 has a lock value block (LVB) (not shown), which is a small amount of memory (anywhere from 16 to 32 bytes) that can be written when the glock 154 is held in exclusive (EX) mode.

One or more applications running on a cluster node 110 may have an interest in a particular file of the shared storage 120. As part of the conventional inode event notification system, inodes 125 associated with these target files may be monitored by the file system 115 for events related to these target files. To listen for an event associated with a particular inode 125, the notification lock for that inode 125 is held in a shared (SH) mode, and a counter associated with that event is incremented in the LVB associated with the inode glock 154. This requires acquiring the DLM lock associated with the inode glock 154 in exclusive mode, setting the event counter in the LVB, and potentially also releasing the DLM lock at some future point in time, should another node 110 require that lock. To stop listening to the event, the notification lock is unlocked and the DLM lock associated with the inode's glock 154 is taken in exclusive mode, and the counter of the LVB is decremented.

When a monitored event occurs somewhere in the cluster infrastructure 100, the fact that the counter for that event in the LVB of the inode DLM lock is non-zero causes the node 110 to grab the notification lock in exclusive mode and then drop it again immediately. The taking of the lock in exclusive mode results in a callback being sent to all the nodes 110 holding the notification lock 152 in shared mode. The shared holders then all drop their locks and re-queue them to be ready for the next event. This also causes a notification to be sent via the file system 115 to the application(s) waiting for that specific event. This notification mechanism relies on the fact that any event which is "interesting" (in the sense that it requires a notification to be sent) requires a DLM lock to be taken at a level that will cause a refresh of the LVB and thus not require any extra communication beyond that for the operation itself.

However, one problem with the inode event notification system described above is in the granting of a new POSIX (Portable Operating System Interface [for Unix]) lease. A file lease provides a mechanism whereby the process holding the lease (the "lease holder") is notified (via delivery of a signal) when a process (the "lease breaker") tries to open or truncate that file. The lease can only be granted if the inode 125 is not open anywhere in the cluster 100 in a particular mode (the mode depends upon the type of lease required). When opening a file utilizing file system 115, a shared lock (DLM mode PR) should be obtained so that holding a lock of an incompatible mode will result in blocking open requests across the cluster 100. However, this still does not tell the requesting process whether any other node 110 is holding this lock open. As such, extra operations need to be performed to obtain full information required for POSIX lease support and inotify support by file system 115.

Embodiments of the invention provide a mechanism to discover the full information needed to implement POSIX lease support and inotify support by changing the DLM lock modes that are in use for the DLM lock associated with the inode's glock 154, and by utilizing a lock counter block (LCB) 156 with two counters (one read 157, one write 158) to track information associated with the glock 154.

The following is a table of the DLM lock modes associated with an inode's glock conventionally used by file systems, such as GFS2:

TABLE 1

(Prior Art)

| Lock Mode | Description |
| --- | --- |
| NL (null lock) | Used to retain LVB content |
| CW (concurrent write) | Used for direct I/O (metadata can be shared, data is not cached) |
| PR (protected read) | Used to share data and metadata |
| EX (exclusive) | Used for exclusive (write access) to the inode |

The following table describes the DLM lock modes associated with an inode's glock 154 that are used in embodiments of the invention:

TABLE 2

| Lock Mode | Description |
| --- | --- |
| NL | Used as a reference count for LVB |
| CR (concurrent read) | Used to retain LVB content (in "normal" no event case) |
| CW | Used for direct I/O |
| PR | Used to share data and metadata |
| PW (protected write) | Used for exclusive (write access) to the inode |
| EX | Used for setting up event notifications |

The change from using the EX to PW DLM lock modes for write access is a direct substitution for all existing file system operations. This can be done because PW is incompatible with every lock mode except NL and CR. In addition, previously, the NL mode was used to retain LVB content while it was unable to hold a higher mode. In the new scheme of embodiments of the invention, the CR mode is used for this purpose. This is possible since CR is compatible with all of the other lock modes aside from EX, and thus with the previous substitution of PW for EX, the CR mode can be used as a direct functional substitution for NL. NL is also compatible with all lock modes including EX and is used as a reference count on the LVB to ensure that the LVB content does not vanish. In particular, the LVBs are normally implemented on DLM locks as a least-recently-used cache or in a similar manner; hence the LVB content may vanish at any particular point in time. With embodiments of the invention, a node holding a file lease (a lease holder) is required to take the NL lock to allow the EX lock to be taken by a node (a lease breaker) trying to open or truncate that file. Previously, the LVB content could disappear between when, for example, the EX lock was released and the lease holder regained its original lock (e.g., CR) mode. By requiring the lease holder to hold the NL lock, embodiments of the invention ensure that the LVB value is retained over the whole operation. In embodiments of the invention, a cluster node 110 maintains a DLM lock associated with an inode glock 154 in at least CR mode all of the time that it has an interest in an inode 125, which is inclusive, by definition, of all of the time for which that inode is open by the node 110. If another cluster node 110 requests an EX lock on the inode, then the inode's lock on the first node 110 will be demoted to NL, but the first node 110 will immediately re-queue a request for a higher lock mode (at least CR) if this occurs.

In addition, embodiments of the invention associate two distributed LCB 156 counters with the DLM lock associated with the inode's glock 154. The LCB is utilized because it allows atomic counter updates for any lock request, not just those requests specific to the EX mode (as normal LVB updates would be). The two distributed LCB counters may be identified as the 'R' counter 157 and the 'W' counter 158. In some embodiments, the LCB 156 may include more than two counters that are associated with each resource in the cluster file system 115.

The LCB counter values can be read by a task when it receives a lock grant and atomically updated upon lock release. The task can update the counters atomically no matter what lock mode it has been holding. One way to implement the LCB is to use a lock value block (LVB) of a VAX-style DLM and add an extra flag to the LVB to indicate that the LVB is to be used as an LCB. Alternatively, a set of counters may be put into a separate part of the interface to implement the LCB 156. There is no strict reason to limit the LCB to a counter implementation in embodiments of the invention. In fact, two single-bit flags would also be suitable provided that multiple updates of the two flags resulted in an "OR" function and that they could both be zeroed by the holder of an EX lock.

In embodiments of the invention, the 'R' counter 157 is incremented if and only if there are one or more local processes which have the inode 125 open read-only. The 'W' counter 158 is incremented if and only if there are one or more local processes which have the inode 125 open read-write. The counters 157, 158 are incremented only in the case of a demote request resulting in a local NL mode (i.e., a remote EX lock request). It is not required for the counters 157, 158 to accurately reflect the number of processes that have the inode 125 open in any particular mode, only that a non-zero count indicates that at least one process does.

In embodiments of the invention, to initialize a watch on a particular lease event, an EX DLM lock under the new scheme shown in Table 2 is taken out by the watching process. This lock blocks any open calls in progress on this inode 125 and also returns, via the counters 157, 158, details of whether any other nodes 110 have the inode 125 open in either read-only or read/write modes. This information can then be used to determine whether to grant the lease or not. Once the decision on the lease has been taken, the counters 157, 158 are zeroed by the watching process when the EX lock is demoted. This again avoids any extra cluster communication and ensures the mutual exclusion between the "open" and "take out a lease" system calls.

If the lease is to be granted, the notification lock 152 for that inode 125 is then taken in a shared state. The EX lock is then dropped and the status (lease granted or failed) is returned to the watching process. If the lease is then broken, the process monitoring for that event will be notified via the conventional notification mechanism already known by those skilled in the art and previously described above.

In some embodiments, the updated lock scheme and LCB counters may improve the recovery process resulting from a failed node 110 in the cluster infrastructure 100. Each time a lease is taken out, the number of open inodes 125 is computed (even though the LVB is used as a communication mechanism). This count of the number of inodes opened is guaranteed to be correct. As a result, there are no specific recovery actions that need to be performed. However, the count of processes that are interested in a particular event may potentially become corrupt in the event of a node 110 failing and leaving the cluster 100. In this case, the worst that can happen is that events will be tracked for which there are no listeners.

In the case of the inode 125 eventually becoming idle and being ejected from the cache 140, the conventional approach was for the LVB to be purged and thus cleaned of the incorrect state. This scenario could be improved upon utilizing embodiments of the invention if there was a way to get feedback from the DLM about the number of locks to which callbacks were sent when granting a particular lock request. In such a case, if a notification lock 152 was set to EX and then unlocked, but it resulted in no notifications to other nodes 110, the counter for that particular event could be reset to zero in the inode's LVB. That would mean that a maximum of one single unwanted event would be generated for each inode 125.

FIG. 2 is a flow diagram illustrating a method 200 performed by a lock manager of a file system for inode event notification for cluster file systems according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by file system 115, and more specifically DLM 150, described with respect to FIG. 1.

Method 200 begins at block 210 where a lock scheme for a cache manager (e.g., a glock) associated with an inode of a cluster file system is implemented. Under this lock scheme, several locks are implemented, including a null lock (NL) used as a reference count for the lock value block (LVB), a concurrent write lock used to retain LVB content in a no event case, a concurrent write (CW) lock used for direct input/output (I/O), a protected read (PR) lock used to share data and metadata, a protected write (PW) lock used for exclusive write access to the inode, and an exclusive (EX) lock used for setting up inode event notifications. Each lock holder can submit a request to convert its lock mode between the above six lock modes. Any one lock holder can only hold a lock in a single lock mode at once.

At block 220, a first global counter and a second global counter are also associated with the cache manager (e.g., the glock) for the inode. In one embodiment, the first global counter tracks processes that have the inode open in read-only mode. The second global counter is used to track processes that have the inode open in read-write mode. These processes may be running on any of a plurality of nodes in the cluster file system. In some embodiments, the counters are implemented as two single-bit flags provided that multiple updates of the two flags resulted in an "OR" function and that they could both be zeroed by the holder of an EX lock.

Subsequently, at block 230, an EX lock on the cache manager (e.g., the glock) of an inode is taken in order to initialize a watch for an event on that inode. Taking the EX lock causes any open calls on the inode by other nodes in the cluster file system to be blocked, their associated locks demoted to the NL lock, and at least one of the first or second global counters to be updated accordingly. At block 240, both of the first and the second global counters are examined to determine whether any of the plurality of nodes in the cluster has the inode open in at least one of a read-only mode or a read-write mode. Lastly, at block 250, it is determined whether to grant a lease on the inode based on the information obtained from examining the first and second global counters.

FIG. 3 is a flow diagram illustrating a method 300 performed by a cluster node for inode event notification for cluster file systems according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by a cluster node 110 implementing a cluster file system 115 described with respect to FIG. 1.

Method 300 begins at block 310 where an inode for a resource is opened when accessing the resource via a cluster file system. In one embodiment, the resource is a file found in storage shared by a plurality of nodes of the cluster file system. At block 320, when the inode is opened, the node maintains at least a CR lock on the cache manager (e.g., the glock) for the inode.

Then, at block 330, the cache manager (e.g., the glock) is demoted to an NL lock due to the taking of an EX lock on the inode's cache manager by another node in the cluster file system. Due to this demotion, the node increments a first global counter if the inode is open in read-only mode or increments a second global counter if the inode is open in read-write mode. Lastly, at block 340, a request for a higher lock mode is re-queued for the inode's cache manager by the node upon the demotion of the cache manager to the NL lock.

Figure 4:
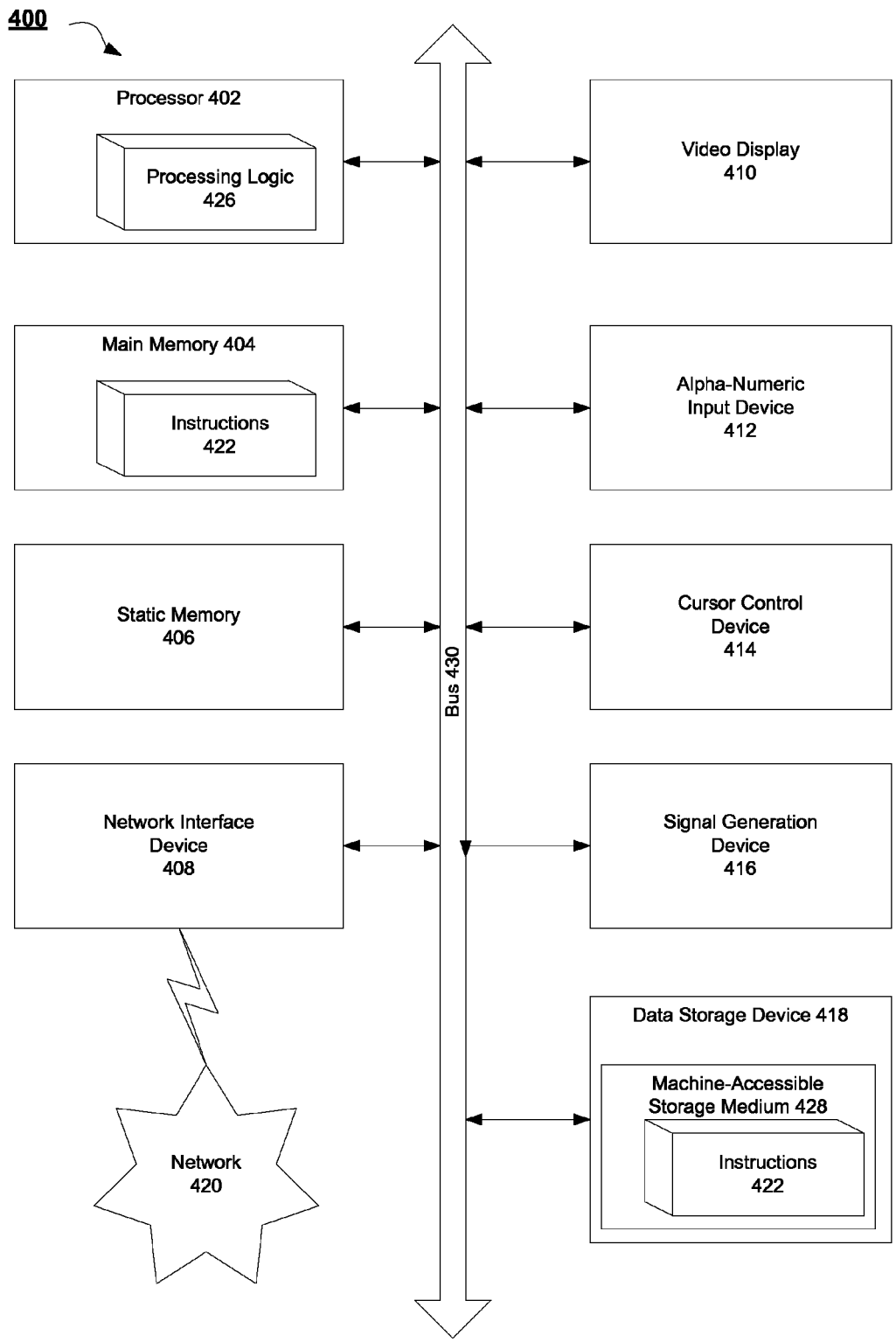
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform inode event notification for cluster file systems by file system 115 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for inode event notification for cluster file systems described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:

implementing, by a cluster file system operating on a processing device, a lock scheme for a cache manager associated with an inode of the cluster file system, wherein the lock scheme comprises lock modes of a null lock (NL) that is used to store a reference count for a lock value block (LVB) and an exclusive (EX) lock that is used for setting up inode event notifications, the inode event notifications sent by the cluster file system when events occur corresponding to locks of inodes of target files of the cluster file system, the inode event notifications sent to applications holding notification locks for the target files;

associating, by the cluster file system, a first global counter and a second global counter with the cache manager for the inode, wherein the first global counter is to track one or more processes that have the inode open in read-only mode and the second global counter is to track processes that have the inode open in read-write mode; and obtaining an EX lock mode on the cache manager of the inode in order to initialize a watch for an event on the inode, wherein obtaining the EX lock mode causes any open calls on the inode by other nodes in the cluster file system to be blocked, their associated locks demoted to the NL lock mode, and at least one of the first or second global counters to be updated accordingly;

wherein any other nodes in the cluster file system with a lock demoted to the NL lock mode are to:

at least one of increment the first global counter when the inode is open in read-only mode at that node or increment the second global counter when the inode is open in read-write mode at that node; and re-queue a request for a higher lock mode for the cache manager of the inode by the node upon the demotion of its cache manager to the NL lock mode.

2. The method of claim 1, further comprising:
examining both of the first and the second global counters to determine whether any of the plurality of nodes in the cluster have the inode open in at least one of a read-only mode or a read-write mode; and
determining whether to take a lease on the inode in view of the information obtained from examining the first and second global counters.

3. The method of claim 1, wherein the first and second global counters are implemented as two single-bit flags such that multiple updates of the two flags resulted in an "OR" function and that the counters can both be zeroed by a holder of the EX lock mode.

4. The method of claim 1, wherein the lock scheme further comprises a concurrent write lock mode used to retain LVB content in a no event case, a concurrent write (CW) lock mode used for direct input/output (I/O), a protected read (PR) lock mode used to share data and metadata, and a protected write (PW) lock mode used for exclusive write access to the inode.

5. The method of claim 1, wherein the first and the second global counter are implemented by using a lock value block (LVB) of a VAX-style distributed lock manager (DLM) and adding an extra flag to the LVB to indicate that the LVB is to be used for the first and second global counters.

6. A system, comprising:
a memory;
a processing device coupled to the memory; and
a cluster file system, coupled to the processing device and the memory, the cluster file system to:
implement a lock scheme for a cache manager associated with an inode of the cluster file system, wherein the lock scheme comprises lock modes of a null lock (NL) that is used to store a reference count for a lock value block (LVB) and an exclusive (EX) lock that is used for setting up inode event notifications, the inode event notifications sent by the cluster file system when events occur corresponding to locks of inodes of target files of the cluster file system, the inode event notifications sent to applications holding notification locks for the target files;
associate a first global counter and a second global counter with the cache manager for the inode, wherein the first global counter is to track one or more processes that have the inode open in read-only mode and the second global counter is to track processes that have the inode open in read-write mode; and
obtain an EX lock mode on the cache manager of the inode in order to initialize a watch for an event on the inode, wherein obtaining the EX lock mode causes any open calls on the inode by other nodes in the cluster file system to be blocked, their associated locks demoted to the NL lock mode, and at least one of the first or second global counters to be updated accordingly;
wherein any other nodes in the cluster file system with a lock demoted to the NL lock mode are to:
at least one of increment the first global counter when the inode is open in read-only mode at that node or increment the second global counter when the inode is open in read-write mode at that node; and
re-queue a request for a higher lock mode for the cache manager of the inode by the node upon the demotion of its cache manager to the NL lock mode.

7. The system of claim 6, wherein the cluster file system is further to:
examine both of the first and the second global counters to determine whether any of the plurality of nodes in the cluster have the inode open in at least one of a read-only mode or a read-write mode; and
determine whether to take a lease on the inode in view of the information obtained from examining the first and second global counters.

8. The system of claim 6, wherein the first and second global counters are implemented as two single-bit flags such that multiple updates of the two flags resulted in an "OR" function and that the counters can both be zeroed by a holder of the EX lock mode.

9. The system of claim 6, wherein the lock scheme further comprises a concurrent write lock mode used to retain LVB content in a no event case, a concurrent write (CW) lock mode used for direct input/output (I/O), a protected read (PR) lock mode used to share data and metadata, and a protected write (PW) lock mode used for exclusive write access to the inode.

10. The system of claim 6, wherein the first and the second global counter are implemented by using a lock value block (LVB) of a VAX-style distributed lock manager (DLM) and adding an extra flag to the LVB to indicate that the LVB is to be used for the first and second global counters.

11. A non-transitory computer readable medium including instructions that, when executed by a processing device, cause the processing device to perform a method comprising:
implementing, by a cluster file system operating on the processing device, a lock scheme for a cache manager associated with an inode of the cluster file system, wherein the lock scheme comprises lock modes of a null lock (NL) that is used to store a reference count for a lock value block (LVB) and an exclusive (EX) lock that is used for setting up inode event notifications, the inode event notifications sent by the cluster file system when events occur corresponding to locks of inodes of target files of the cluster file system, the inode event notifications sent to applications holding notification locks for the target files;
associating, by the cluster file system, a first global counter and a second global counter with the cache manager for the inode, wherein the first global counter is to track one or more processes that have the inode open in read-only mode and the second global counter is to track processes that have the inode open in read-write mode; and
obtaining an EX lock mode on the cache manager of the inode in order to initialize a watch for an event on the inode, wherein obtaining the EX lock mode causes any open calls on the inode by other nodes in the cluster file system to be blocked, their associated locks demoted to the NL lock mode, and at least one of the first or second global counters to be updated accordingly;
wherein any other nodes in the cluster file system with a lock demoted to the NL lock mode are to:
at least one of increment the first global counter when the inode is open in read-only mode at that node and increment the second global counter when the inode is open in read-write mode at that node; and
re-queue a request for a higher lock mode for the cache manager of the inode by the node upon the demotion of its/ cache manager to the NL lock mode.

12. The non-transitory computer readable medium of claim 11, wherein the method further comprises:
examining both of the first and the second global counters to determine whether any of the plurality of nodes in the cluster have the inode open in at least one of a read-only mode or a read-write mode; and
determining whether to take a lease on the inode in view of the information obtained from examining the first and second global counters.

13. The non-transitory computer readable medium of claim 11, wherein the first and second global counters are implemented as two single-bit flags such that multiple updates of the two flags resulted in an "OR" function and that the counters can both be zeroed by a holder of an EX lock mode.

14. The non-transitory computer readable medium of claim 11, wherein the lock scheme further comprises a concurrent write lock mode used to retain LVB content in a no event case, a concurrent write (CW) lock mode used for direct input/output (I/O), a protected read (PR) lock mode used to share data and metadata, and a protected write (PW) lock mode used for exclusive write access to the inode.

15. The non-transitory computer readable medium of claim 11, wherein the first and the second global counter are implemented by using a lock value block (LVB) of a VAX-style distributed lock manager (DLM) and adding an extra flag to the LVB to indicate that the LVB is to be used for the first and second global counters.

\* \* \* \* \*